United States Patent
Lee et al.

(10) Patent No.: US 7,870,148 B2
(45) Date of Patent: Jan. 11, 2011

(54) SCALABLE COMPUTATION OF DATA

(75) Inventors: Yuchun Lee, Sudbury, MA (US); Ruby L. Kennedy, Bedford, MA (US); David F. Cheung, Potomac, MD (US)

(73) Assignee: Unica Corporation, Waltham, MA (US)

( * ) Notice: Subject to any disclaimer, the term of this patent is extended or adjusted under 35 U.S.C. 154(b) by 1692 days.

(21) Appl. No.: 10/418,337

(22) Filed: Apr. 18, 2003

(65) Prior Publication Data

US 2004/0210562 A1    Oct. 21, 2004

(51) Int. Cl.
G06F 7/00    (2006.01)

(52) U.S. Cl. .................................. 707/774; 707/769

(58) Field of Classification Search .............. 707/2, 707/3, 4, 5, 10, 100, 104.1; 715/503, 762; 705/14

See application file for complete search history.

(56) References Cited

U.S. PATENT DOCUMENTS

| | | | |
|---|---|---|---|
| 5,822,751 A * | 10/1998 | Gray et al. | 707/3 |
| 5,890,151 A * | 3/1999 | Agrawal et al. | 707/5 |
| 5,899,988 A * | 5/1999 | Depledge et al. | 707/3 |
| 5,937,408 A * | 8/1999 | Shoup et al. | 707/102 |
| 6,160,549 A * | 12/2000 | Touma et al. | 715/762 |
| 6,161,103 A * | 12/2000 | Rauer et al. | 707/4 |
| 6,263,334 B1 * | 7/2001 | Fayyad et al. | 707/5 |
| 6,321,241 B1 * | 11/2001 | Gartung et al. | 715/503 |
| 6,493,708 B1 * | 12/2002 | Ziauddin et al. | 707/3 |
| 6,606,621 B2 * | 8/2003 | Hopeman et al. | 707/3 |
| 6,684,207 B1 * | 1/2004 | Greenfield et al. | 707/3 |
| 6,691,120 B1 * | 2/2004 | Durrant et al. | 707/100 |
| 6,915,289 B1 * | 7/2005 | Malloy et al. | 707/2 |
| 6,917,940 B1 * | 7/2005 | Chen et al. | 707/10 |
| 6,959,305 B2 * | 10/2005 | Bird et al. | 707/104.1 |
| 2002/0046116 A1 * | 4/2002 | Hohle et al. | 705/14 |
| 2003/0009467 A1 * | 1/2003 | Perrizo | 707/100 |

* cited by examiner

*Primary Examiner*—Neveen Abel Jalil
*Assistant Examiner*—Paul Kim
(74) *Attorney, Agent, or Firm*—Fish & Richardson P.C.

(57) ABSTRACT

Techniques for producing a cross tabulation are described. The techniques involve issuing a plurality of queries to a database. The queries are for each of at least one sublevel of data for each of at least one dimension of data associated with records in the database. The queries provide sublists of sorted identifiers for each one of the queries. The technique determines occurrences of intersections of levels of one dimension with levels of another dimension of the data associated with records in the database by traversing the sublists to detect intersections of the dimensions.

48 Claims, 8 Drawing Sheets

| customer id | age | income |
|---|---|---|
| A | 1 | b |
| B | 2 | c |
| C | 1 | a |
| D | 3 | b |
| E | 2 | a |
| F | 1 | c |
| G | 3 | d |
| H | 4 | d |

SCALABLE COMPUTATION OF DATA

BACKGROUND

This invention relates to data mining and in particular to evaluating data from a database producing results similar to those of using on-line analytical processing (OLAP) but in a far more computationally efficient manner.

In problems such as in extracting market data from a database, data is often organized in dimensions that are in a hierarchy. For example, records are often assigned ID's and the records will have data for various attributes that a user may wish to track. An example of a dimension hierarchy might be age. The hierarchy of age can have levels as young, middle, and old. Within each of these levels of young, middle and old can be various numeral age groupings or sublevels such as young being 18-25 or 25-30; middle being 30-40 and 40-55; and old being 55-65 and 65 and over, and so forth. A second hierarchy might be income, with income having different levels and sublevels. Competing approaches to evaluate cross tabulations of age and income in this example use techniques where the number of computations is related to the number of dimensions and number of levels or sublevels of the data. For very complex or large number of dimensions, the computations increase at an exponential rate.

SUMMARY

According to an aspect of the present invention, a method of producing a cross tabulation, includes issuing a plurality of queries to a database, the queries being for multiple sublevels of data for multiple dimensions of data associated with records in the database to provide a sublist of sorted record identifiers for each one of the queries and determining occurrences of intersections of levels of one dimension with levels of another dimension of the data associated with records in the database by traversing the sub-lists to detect intersections of the dimensions.

According to a further aspect of the present invention, a computer program product resides on a computer readable medium. The computer program product is for producing a cross tabulation structure. The computer program includes instructions for causing a computer to issue a plurality of queries to a database, the queries being for multiple sublevels of data for multiple dimensions of data associated with records in the database to provide a sublist of sorted record identifiers for each one of the queries, determine occurrences of intersections of levels of one dimension with levels of another dimension of the data associated with records in the database by traversing the sub-lists to detect intersections of the dimensions, and indicate in a cross-tabulation structure each time an intersection of one dimension with levels of another dimension of the data is found.

According to a further aspect of the present invention, an apparatus includes a processor, a memory coupled to the processor, and a computer storage medium. The computer storage medium stores a computer program product for producing a cross tabulation structure. The computer program includes instructions which when executed in memory by the processor, causing the apparatus to issue a plurality of queries to a database, the queries being for multiple sublevels of data for multiple dimensions of data associated with records in the database to provide a sublist of sorted record identifiers for each one of the queries, determine occurrences of intersections of levels of one dimension with levels of another dimension of the data associated with records in the database by traversing the sub-lists to detect intersections of the dimensions and indicate in a cross-tabulation structure each time an intersection of one dimension with levels of another dimension of the data is found.

One or more aspects of the invention may provide one or more of the following advantages.

The process allows the user to specify the dimensions in a query statement, thus allowing the user to specify 2 dimensions, 3 dimensions, and so forth. The process executes sets of queries for each specified dimension only once, while construction of each structure is accomplished by matching/merging sorted ID lists. The process performs pre-aggregation of data for fast display/drill-down by computing a structure quickly after some initial sorting operations. The process can work over multiple dimensions of data, where it is needed to aggregate data over multiple dimensions for analysis while avoiding an exponential growth situation. The algorithm performs a very efficient 1-pass through the data.

The process provides a number of performance improvements over competing processes. For instance, the speed of calculations is based on the sum of the number of levels over all dimensions or the sum of the most granular number of levels for each dimension if the hierarchy can be rolled up from lower levels.

For a single-dimension query, the computation is of the order (n log n), where n is the number of rows of data being processed, assuming that the data is not sorted. For calculating multiple dimensions, the calculation is of the order of (n log n) times m, where m is the number of levels across all dimensions (or the number at the most granular levels across all dimensions if the hierarchy can be rolled up from lower levels). If the data is returned from a database with the fields already sorted, the calculation complexity is of the order (n×m). This approach can be 10 to 100 times faster than competing approaches which have a calculations on the order of n * the number of complex queries=f(number of dimensions and levels).

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 is a block diagram of a table.

DETAILED DESCRIPTION

Figure 1:
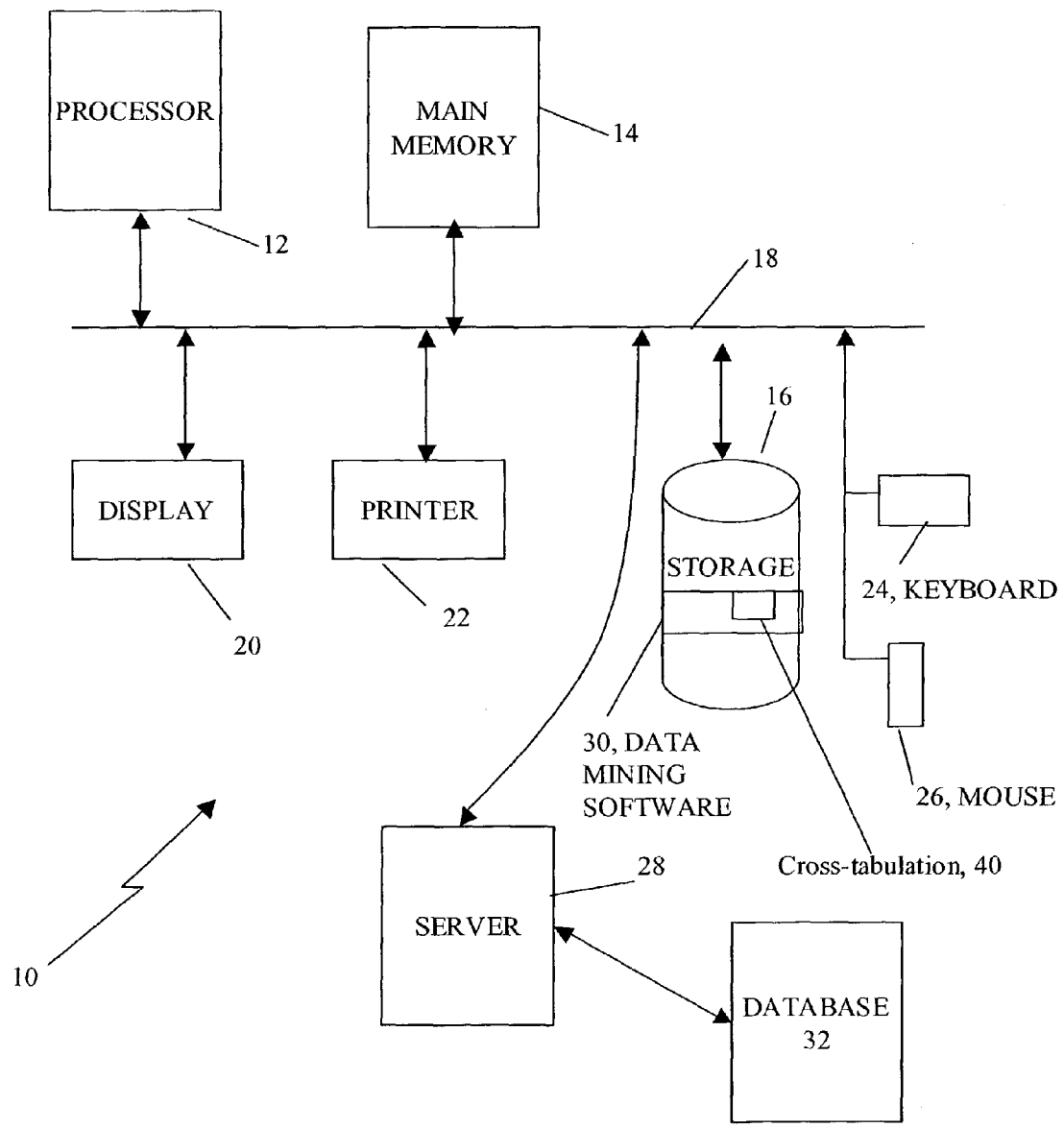
FIG. 1 is a block diagram of a computer system accessing a database.

Referring now to FIG. 1, a computer system 10 includes a CPU 12, main memory 14 and persistent storage device 16 all coupled via a computer bus 18. The system 10 also includes output devices such as a display 20 and a printer 22, as well as user-input devices such as a keyboard 24 and a mouse 26. Not shown in FIG. 1 but necessarily included in a system of FIG. 1 are software drivers and hardware interfaces to couple all the aforementioned elements to the CPU 12.

The computer system 10 also includes marketing automation/Campaign Management software 30 that resides in storage 16 and which operates in conjunction with a database 32. The marketing automation/Campaign Management software 30 supports various types of campaign programs. The marketing automation/Campaign Management software 30 allows a user to quickly form cross-tabulations of records in the database using a cross-tabulation process 40. The marketing automation/Campaign Management software 30 is shown residing in storage 16 but could reside in storage in server 28 as part of a client-server arrangement, or can be configured in other manners.

Figure 2:
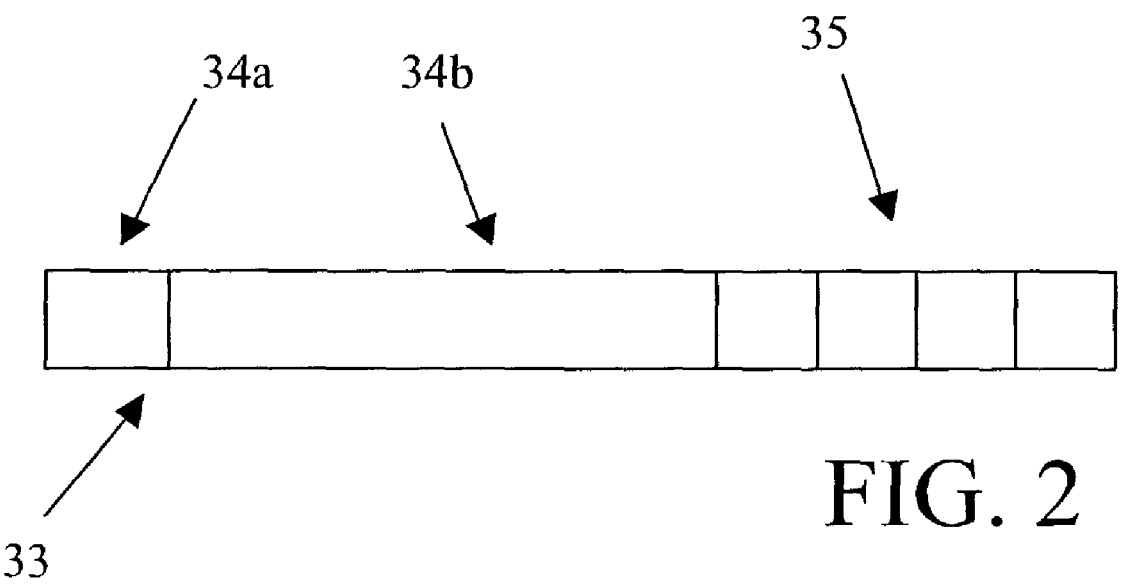
FIG. 2 is a block diagram an exemplary record in the database.

Referring now to FIG. 2, a data set includes a plurality of records with record 33 being illustrative. The record 33 can include an identifier field 34a, as well as one or a plurality of fields 34b corresponding to values that may be used in the marketing automation/Campaign Management software 30. The record 33 also includes a plurality of result fields 35 that are used by a modeling process (part of the marketing automation/Campaign Management software 30 or independent software on either the computer system 10 or the server 28) to record scores for the record 33. The record 33 can also include key fields (not shown) that are used to join and navigate between database tables (not shown). Typically, for each of the records, one (or more) of the fields would be a primary key for that record in the record's primary table and the others would be secondary keys for tables that it might be joined to according to some characteristic or search request.

Figure 3:
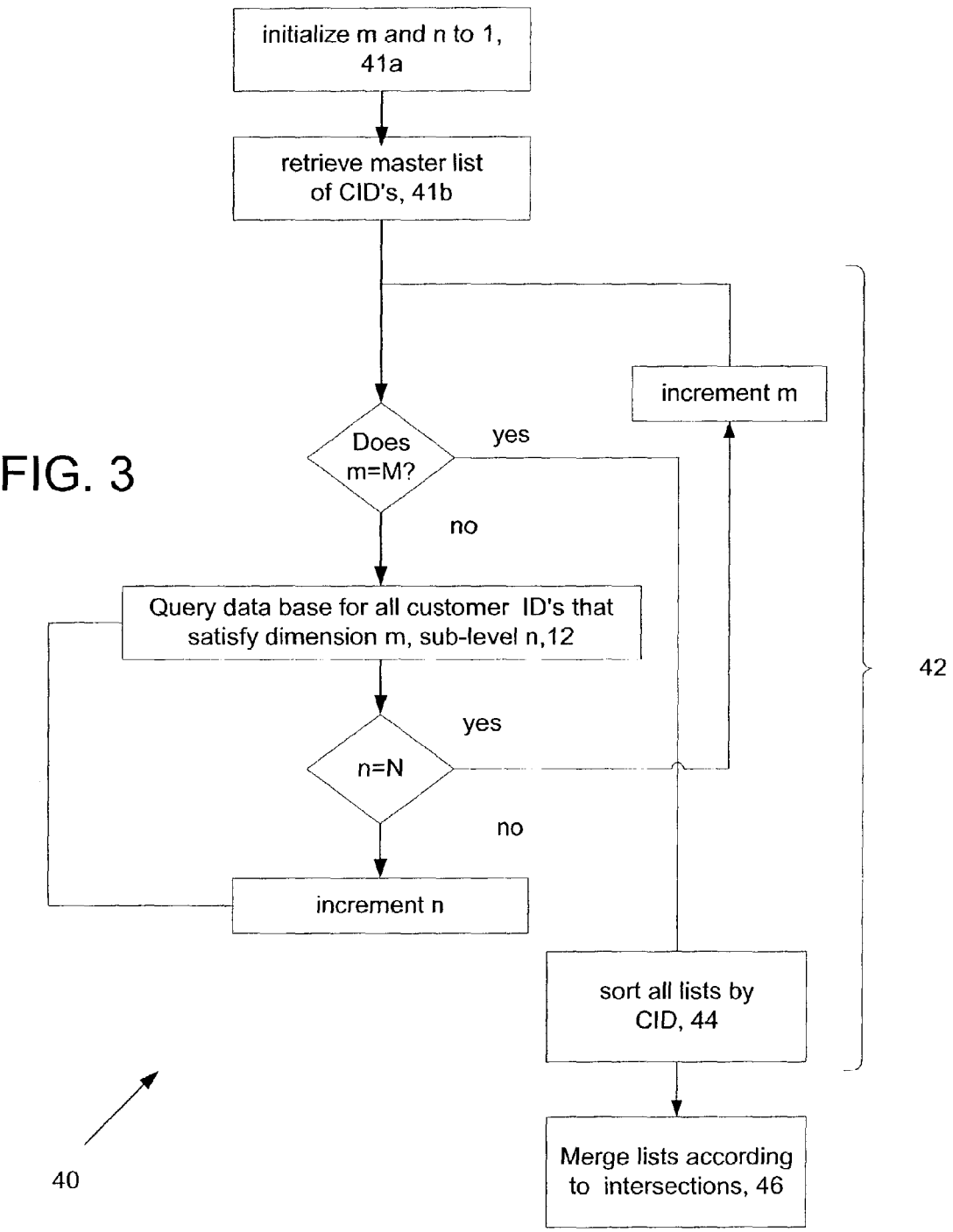
FIG. 3 is a flow chart of a cross-tabulation technique.

Referring to FIG. 3, cross-tabulation process 40 produces an n×n (e.g., a 4×4 cube or cross-tabulation structure) (FIG. 6) of counts of occurrences of records 33 in the database 32 that have intersecting levels of data for different dimensions of data (fields) in the records 33.

However, the algorithm does not require the number of sublevels in each dimension to be equal (i.e., it works equally to generate an n×m structure). In an illustrated embodiment, database 32 stores records 33 of potential contacts for the marketing automation/Campaign Management software 30. The records 33 have fields that specify an audience (e.g., customer ID), and for each audience ID, other attributes (e.g., age and income) of the customer. Other examples of different audiences (e.g., household, account, customer, business), types of data, or different types of records can be used.

The process 40 initializes 41a indices m and n to m=1 and n=1 and issues 41b a master query to retrieve a list of unique record ID's, e.g., Customer ID's. The process 40 issues 42, the queries of the form, Select <Audience ID(s)> from <DB table> where <query condition> order by <Audience ID(s)>" to the database 32 to retrieve lists of Customer IDs that satisfy each of the queries. The <query condition> in each query is based on the boundary conditions for each of the levels or sublevels of a dimension. The details in the flow chart of issuing the query is illustrative only to convey the sense that in one approach multiple queries are issued for the first dimension and thereafter multiple queries are issued for the second dimension and so forth. Other arrangements can be used of course.

In the example to be described, a count of customers with certain ages and incomes is desired. The query set can be organized to search the database to retrieve Customer ID's over sublevels of ages and incomes, e.g., with age and income in this example each having four sublevels. The queries in this case might be:

Select Cust_ID from TableX where Age<25 order by Cust_ID
Select Cust_ID from TableX where Age>=25 and Age<35 order by Cust_ID
Select Cust_ID from TableX where Age22 =35 and Age<50 order by Cust_ID
Select Cust_ID from TableX where Age>=50 order by Cust_ID
Select Cust_ID from TableX where Age<18 order by Cust_ID
Select Cust_ID from TableY where Income<25,000 order by Cust_ID
Select Cust_ID from TableY where Income>=25,000 and Income<50,000 order by Cust_ID
Select Cust_ID from TableY where Income>=50,000 and Income<75,000 order by Cust_ID
Select Cust_ID from TableY where Income>=75,000 order by Cust_ID These queries return record identifiers, e.g., Customer ID's in a form of a list that are sorted 44 by Customer ID 14 into a like plurality of sub-lists. In general, sorting is part of the process performed by the database returning results from the queries. Alternatively, the sub-lists that returned can be sorted using any efficient sorting technique. The process merges 46 the returned lists according to intersections between age and income (dimensions of data in the sub-lists) by scanning the sub-lists to produce count information that is used to populate a cross-tabulation structure (FIG. 6) to indicate how many records exist in each combination of age and income sublevels. While the database could contain a very large number, e.g., a billion or more rows or records, by applying the process 40 the results are obtained quickly.

In the illustrative embodiment of building a 4×4 cross-tabulation structure, the process 40 issues 42 four queries to produce sub-lists of customer ID's that are in age bracket 1, customer ID's that are in age bracket 2, customer ID's that are in age bracket 3, and customer ID's that are in age bracket 4. The process also issues 42 four additional queries to produce sub-lists of customer ID's that are in income bracket a, customer ID's that are in income bracket b, customer ID's that are in income bracket c, and customer ID's that are in income bracket d. The total number of queries in this example is 8, which is one query for each age bracket and one for each income bracket. There is no need for the number of brackets for each dimension to be the same as they are in this example. Ideally, each list of customer ID's are already sorted by the database. Based on those 8 queries, the process sorts 44 if necessary and finds 46 the cross tabulation between qualifying age and income and populates the 4×4 cross-tabulation structure (FIG. 6) as further explained below.

Referring to FIG. 4, the database 32 (exemplary depiction) has records corresponding to 8 customers with customer ID's A-H and these customers have ages and incomes that fall within groups 1-4 and a-d as illustrated. Thus, customer A has an age in sublevel 1 and an income in sublevel b, customer B has an age in sublevel 2 and an income in sublevel c and so forth.

Figure 5:
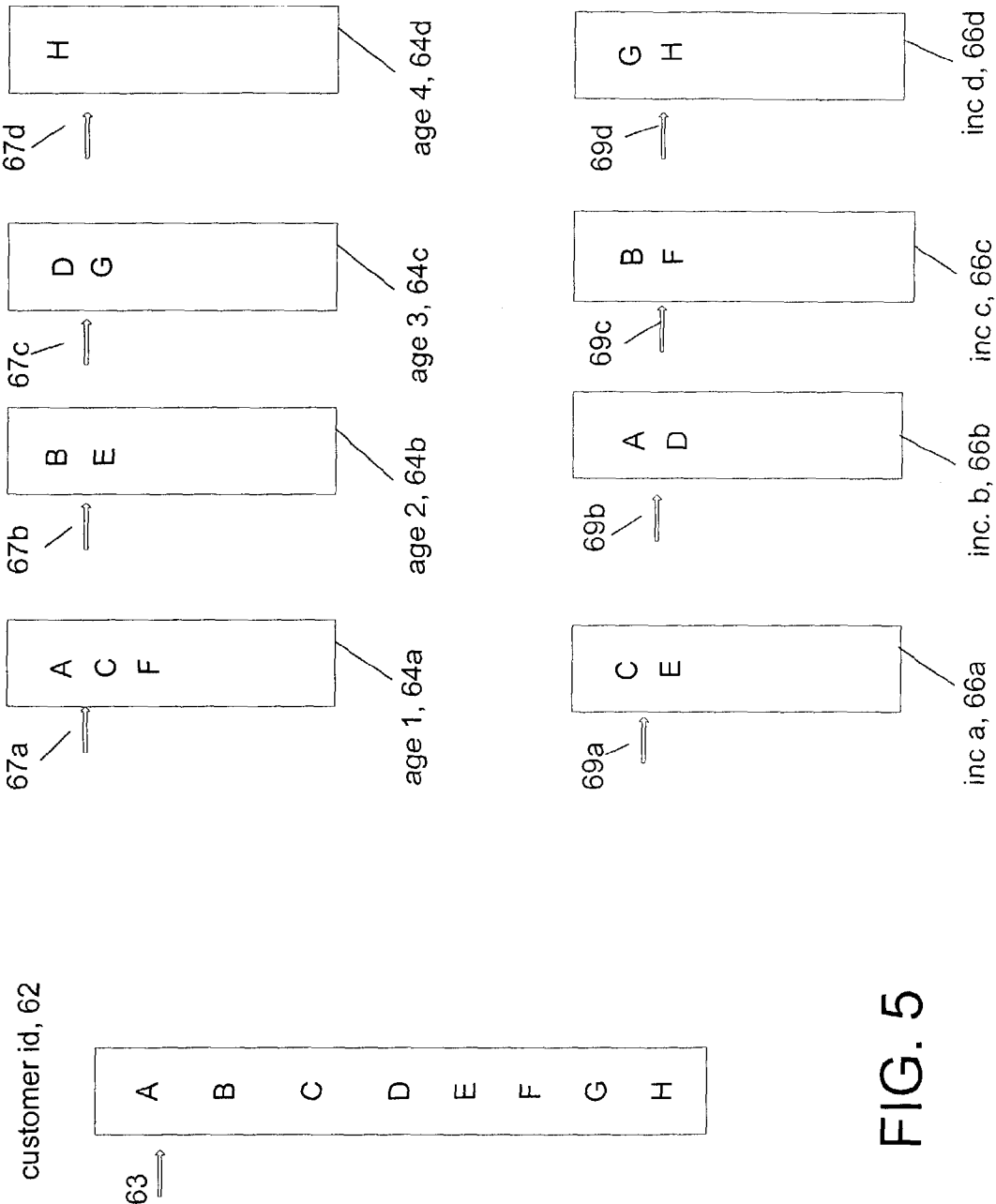
FIG. 5 is diagram depicting sorted lists and cursors.

Referring now to FIG. 5, the process 40 produces a master list 62 of all the customers here A-H and issues a query to return a sub-list 64a of all Customer ID's that have ages that fall within sublevel 1 (which are Customer ID's A, C, and F). The process issues a second query to return a sub-list 64b of all Customer ID's that have ages that fall within sublevel 2, (which are Customer ID's B and E), a third query to return a sub-list 64c of all Customer ID's that have ages that fall within sublevel 3, (which are Customer ID's D and G), and fourth query to return a sub-list 64d of all Customer ID's that have age that fall within sublevel 4 (which is Customer ID H).

A second set of queries is issued for income, the second dimension of the structure. The second set has a fifth query to return a sub-list 66a of customer ID's for Income for "sublevel a" which are Customer ID's C and E. A sixth query is issued to return a sub-list 66b of customer ID's for income for "sublevel " b", which are Customer ID's A and D, a seventh query returns a sub-list 66c of customer ID's for income for "sublevel c", which are Customer ID's B, and F and an eighth query is issued to return a sub-list 66d of customer ID's for income for "sublevel d", which are Customer ID's G and H.

Thus, between the two sets of queries (one set for age and one set for income), 8 queries are issued since each dimension of age and income has 4 sublevels. The number of queries issued is the sum of the number of sublevels, not the product. The sorted lists 62, 64a-64d and 66a-66d are indexed by cursors or pointers 63, 67a-67d and 69a-69d respectively.

Figure 6:
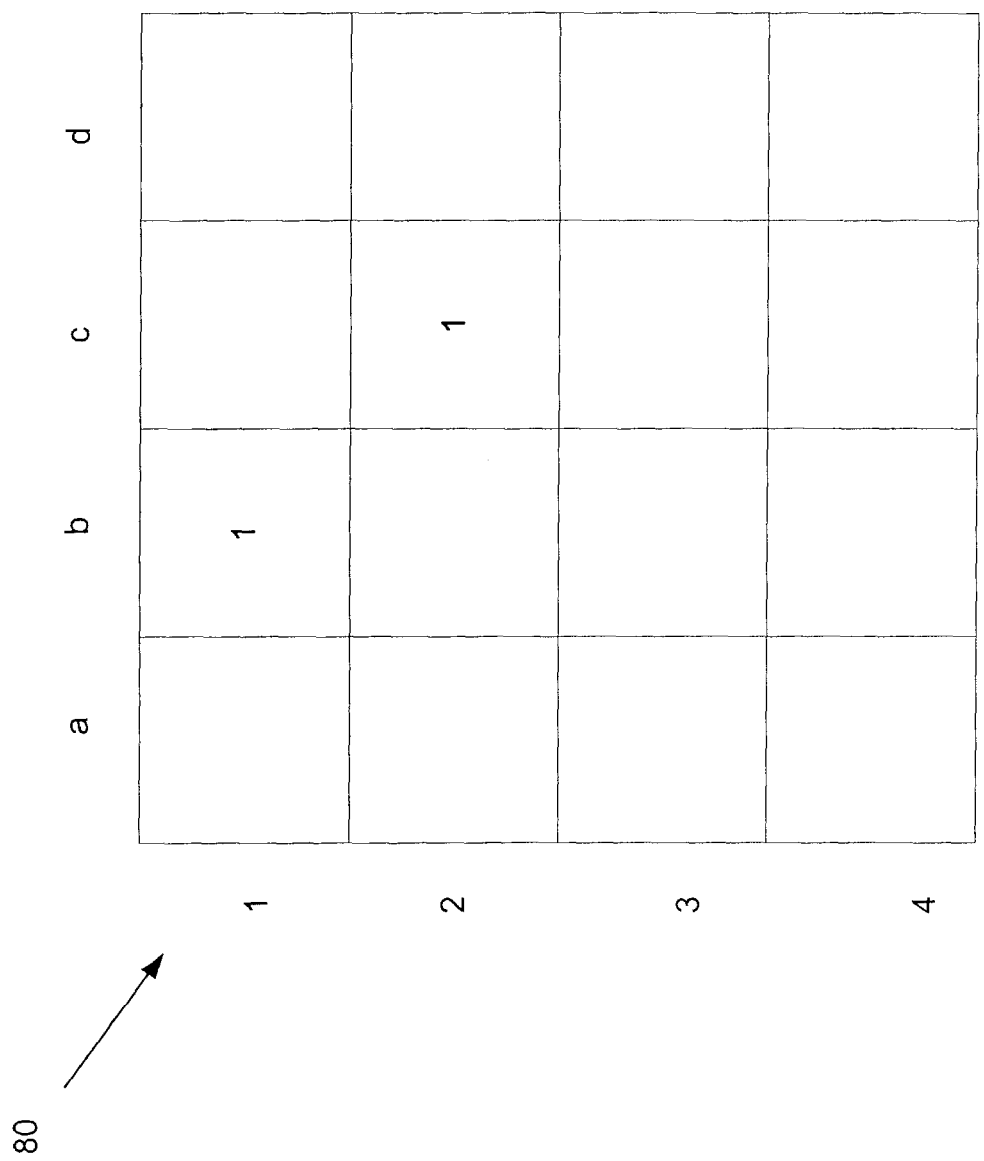
FIG. 6 is a diagram depicting a two-dimension cross-tabulation structure.

Referring now to FIG. 6, the process 40 merges 46 those lists by looking for intersections and thus generates a two dimensional array 80 having as dimensions the sublevels 1, 2, 3, 4, for the dimension "age" and the sublevels a, b, c and d for the dimension "income." The process 40 produces an n×n structure (e.g., 4×4) where i is the number of sub-lists for each dimension. Thus, each cell of the structure 80 is an intersection corresponding to the sublevel of each dimension, age and income. The cell is populated with a value that represents the number of times that there was an intersection (common Customer ID) between a sublevel of age and a sublevel of income.

Figure 7:
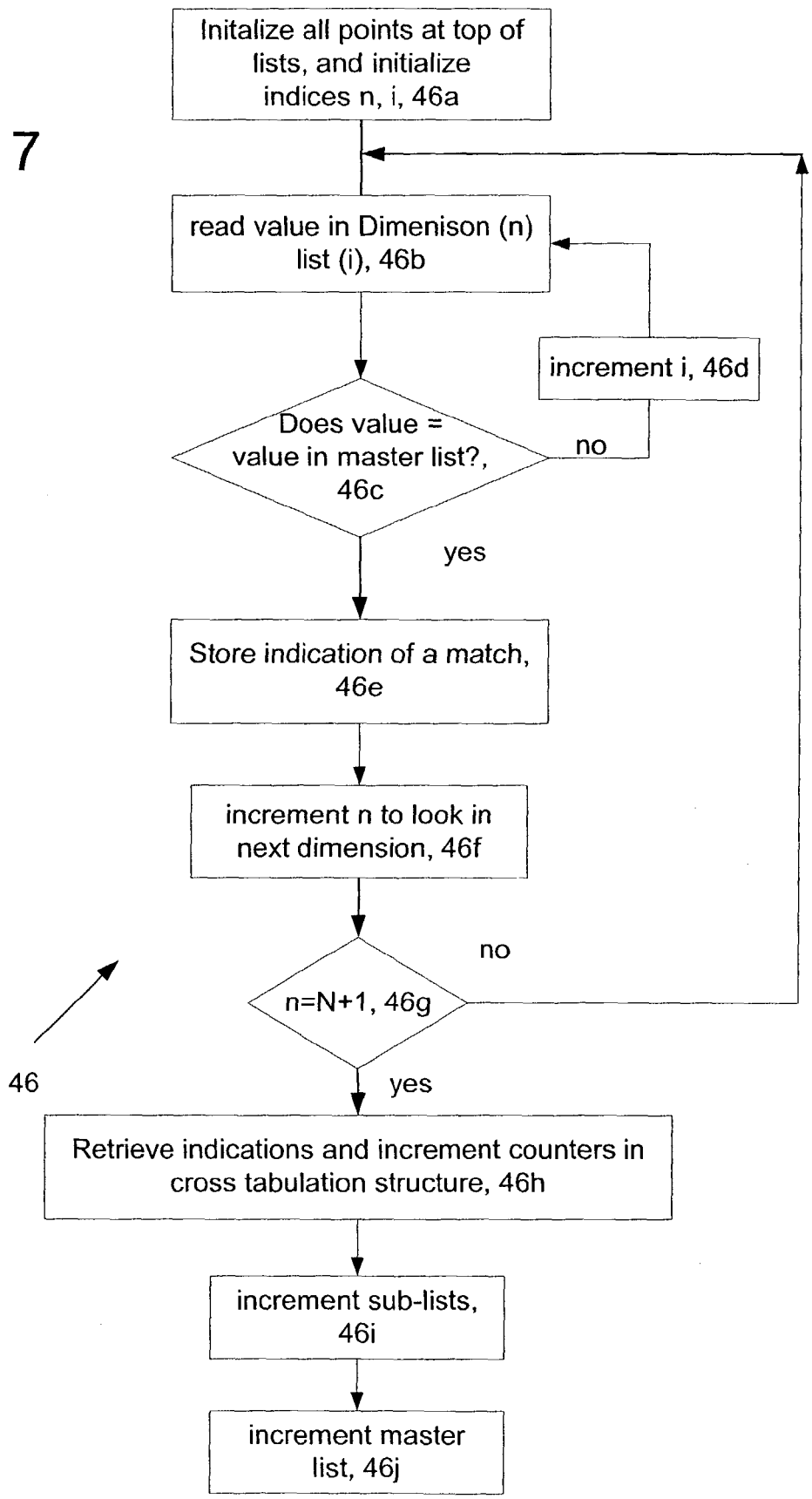
FIG. 7 is a flow chart of a merging technique.

Referring to FIG. 5 and FIG. 7, scanning or merging 46 of the sub-lists is accomplished by initializing 46a the cursors 63, 67a-67d and 69a-69d at the top of each of the sub-lists 62, 64a-64d and 66a-66d respectively to the value one (FIG. 5). The merging process 46 also initializes indices of the lists 64a-64d and 66a-66d to the value one, which in FIG. 7 are represented as dimension n (age, income) and sub-lists i, where n=2 and i=4 (for both dimensions). Initially the cursor 63 for list 62 points to a location where the first sorted ID (value Customer ID "A" in this example) is stored in the master list. The cursor 67a at list 64a in this example also points to a location where the value Customer ID "A" is stored in the sub-list 64a representing those customers that have an age that falls in age sublevel 1. The cursor 67b at list 64b in this example points to a location where the value Customer ID "B" is stored and so forth.

The process 46 iterates over the lists in the first dimension to find the Customer ID "A" by reading 46b the entry at the top of a first list comparing 46c it to the current value in the master list and incrementing the index of the list being examined 46d until the value Customer ID "A" is found. Finding that occurrence ends the loop if the lists are mutually exclusive, otherwise, an indication of a match is stored and the value of i is incremented to check the remaining lists. The process 46 stores the indication that list 64a had the value of Customer ID "A" and increments 46f the value "n" to find the occurrence of A in the second dimension, e.g., sub-lists 66a-66d corresponding to income. The process loops through those lists till it finds Customer ID "A" in sub-list 66b. Finding of Customer ID A in both dimensions is an intersection of those two dimensions (Age and Income) so that the cell (1,b) in the two dimensional array 80, in the simplest case, is incremented 46h to have a value of "1" indicating that there was a intersection between income sublevel b and age sublevel 1. In variations, computations other than count can be calculated (e.g., min, max, average, sum, etc. of some other attribute or field).

After the Customer ID "A" is found in all dimensions (here two) the cursors for the sub-lists (here sub-lists 64a and 66b) where A was found are incremented 46i. The cursor 63 is also incremented 46j for the customer list 62 to Customer ID "B" and the process repeats until all entries in the master list 62 have been used.

The merging process 46 scans down the lists by incrementing the cursors when merging 46 finds intersections of age and income. The intersections are used to populate the two-dimensional array 80 (FIG. 6). The single-pass scanning process can be visualized as popping each entry off of the list, analogous to incrementing pointers and popping entries off of stacks. In the lists 62, 64a-64d and 66a-66d, the entries are guaranteed to be in order because the entries are sorted. The lists are sorted alphabetically if the values are text strings or numerically if they are numbers. Any sort order can be used as long as the sort criteria are consistent across the master list and all sub-lists.

The process 46 calculates the values for each cell in the structure 80, which could be simple counts. The process 46 scans all the lists in one pass. The process goes down the master list 62 of CIDs and looks for a value of that CID in sub-lists 64a-64d and 66a-66d. When the process finds the value of the CID for all dimensions of data in the sub-lists 64a-64d and 66a-66d, the process performs the required calculations (e.g., adds the occurrence to the value already in the cell for computing simple counts) in the cross-table and increments only those cursors of cursors 67a-67d and 69a-69d of the sub-lists where the values were found. Thus, the initial sorting of the results of the query allows the cross-tabulation structure to be constructed from a single linear pass through the sub-lists 64a-64d and 66a-66d.

If the sub-lists of a dimension are mutually exclusive (i.e., the sub-lists do not have common members and the queries used to form the sub-lists had disjoint boundaries), once the process 46 finds the CID in a sub-list of a dimension, the process 46 no longer needs to search through the other sub-lists for that dimension, as is indicated in 46f of FIG. 7. If the sub-lists of a dimension are not mutually exclusive, (i.e., the sub-lists may have common members and the queries used to form the sub-lists had overlapping boundaries), then once the process finds the CID in one sub-list of a dimension, the process still scans the remaining sub-lists of that dimension for additional occurrences of that value of CID.

The process 40 allows the user to specify the dimensions and the raw SQL statements, thus allowing the user to specify 2 dimensions, 3 dimensions, and so forth. The process 40 executes the sets of queries for each specified dimension only once, while the construction of each structure is accomplished by a single-pass matching/merging process of the sorted ID lists.

The process 40 performs pre-aggregation of data for fast display/drilling by computing a structure quickly after some initial sorting operations. The process 40 can work over multiple dimensions of data (e.g., age, income), where it is need to aggregate data over multiple dimensions (2 or more) for analysis avoiding an exponential growth problem situation. The algorithm performs a very efficient 1-pass through the data.

The process 40 allows the user to specify the dimensions in a query statement, thus allowing the user to specify 2 dimensions, 3 dimensions, and so forth. The process 40 executes sets of queries for each specified dimension only once, while constructing a structure by performing matching/merging processes on sorted ID lists, e.g., 64a-64d and 66a-66d. The process 40 performs pre-aggregation of data for fast display/drill-down by computing structure 80 quickly. The process can work over multiple dimensions of data, where it is needed to aggregate data over multiple dimensions for analysis while avoiding an exponential growth situation. The algorithm performs a very efficient 1-pass through the data.

The process 40 provides a number of performance improvements over competing processes. For instance, speed of calculations is based on sum of the number of bins over all dimensions, though if multiple hierarchical levels of a dimension can be rolled up from lower levels, only queries for the lowest level of granularity need to be executed, further increasing the computational efficiency. For a single-dimension query, the computation is of order (n log n), where n is the number of rows of data being processed, assuming that the data is not sorted. For calculating multiple dimensions, the calculation is of the order of n log n times m, where m is the number of levels across all dimensions (or the number at the most granular levels across all dimensions if the hierarchy can be rolled up from lower levels). If the data is returned from a database with the fields already sorted, the calculation complexity is of the order (n×m). This approach can be 10 to 100 times faster than competing approaches which have calculations on the order of n * the number of complex queries=f (number of dimensions and levels).

Furthermore, the process 40 simplifies the queries that are required to be executed by the database 32. Two queries of the form "Field1=X" and "Field2=Y" are computationally more efficient to execute than a single query of the form "Field1=X AND Field2=Y". Not only does the cross-tabulation process 40 reduce the number of queries required from a geometric progression to a linear one, it also reduces the complexity of the queries to be executed. This adds to the performance advantage of this approach.

The process 40 can be used with more than two dimensions, e.g., adding a 3rd dimension (age, income, geography) to the example, requires 12 queries (assuming each dimension has 4 sublevels) to handle 64 total cells. The number of required queries to execute the cross-tabulation 40 increases linearly (n+m+ . . . +x), where n, m, . . . , x represent the number of sublevels in each dimension, while analysis increases geometrically (n*m* . . . *x).

Figure 8:
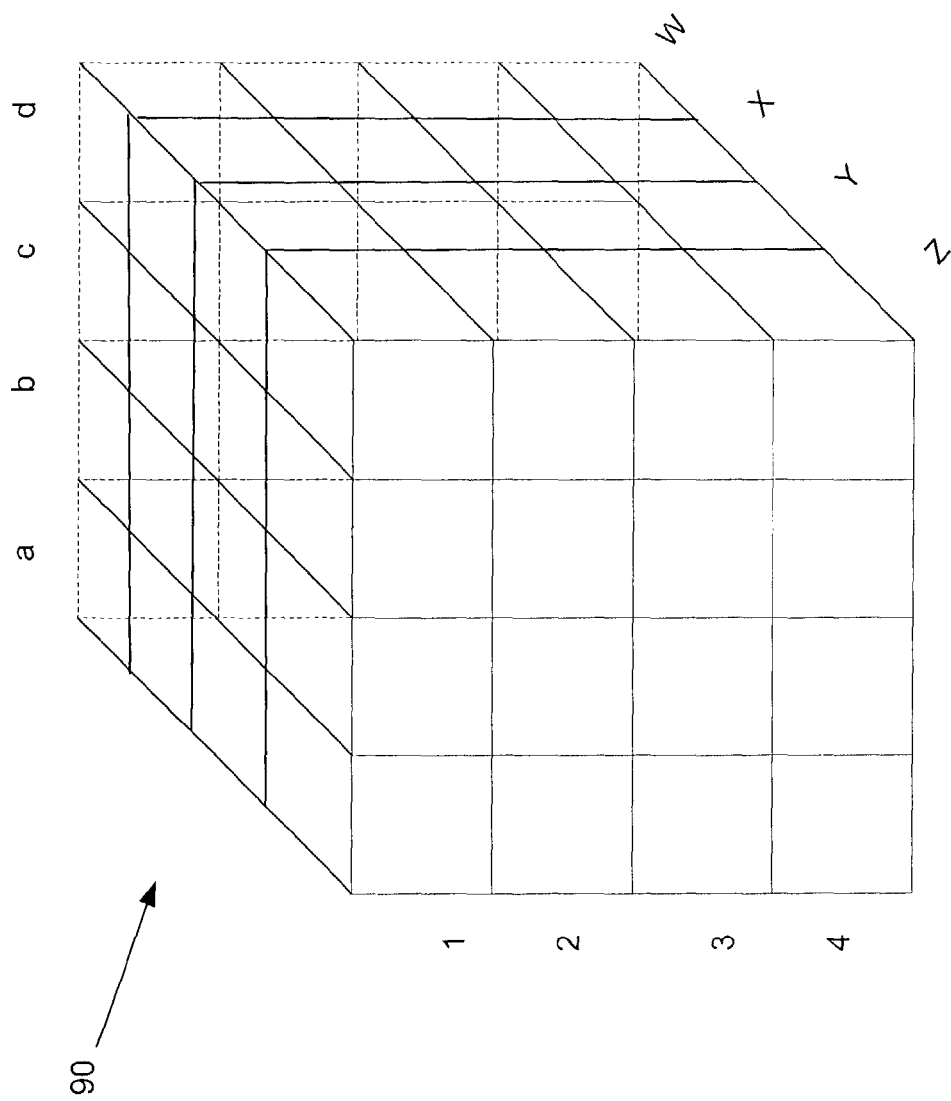
FIG. 8 is a diagram depicting a three-dimensional cross-tabulation structure.

Referring to FIG. 8, another example of a cross-tabulation structure 90 here having three dimensions is shown. In FIG. 8, the third dimension (e.g., territory) is added to the query to produce data from the database. The number of cells thus increases by a factor of the number of levels of "territory." The table in FIG. 8 has age, income, and territory dimensions (each with 4 sublevels, and hence 64 cells in the structure 90). The territory dimensions are denoted as W, X, Y and Z. The number of queries that the process generates is 3×4=12 plus 1 query for the master list for a total of 13 queries. With the 13 queries, the process can handle 64 cells of accumulation (4*4*4).

Computing efficiency for an increased number of dimensions is related to the number of levels in each dimension. For example, assume that along the age dimension is a top Level "All", sublevels "Young|Middle|Old", and each of the sublevels are broken down into further sub—sublevels "16-21, 22-25, 26-30", "31-35, 36-40, 41-50", and "51-60, 61-70, 71+." Thus, there is one level ALL, there are sublevels YOUNG, MID and OLD, and underneath the sublevels there are 9 additional sub-sublevels of numerical age groupings. In this situation, if a user wanted to completely compute the cross-product through all of the levels and be able to determine how many people are young what income at specified level, there would be a larger number of cells in the cube.

When upper levels can be easily computed from lower levels (i.e., the boundaries of lower levels roll up cleaning into upper levels), the number of queries that the process would issue would be equal to the sum of numbers of the lowest level per dimension. So the number of computations is equal to the sum across all dimensions over the number of bins in the lowest dimension.

If the bins overlap then the number of queries is equal to not just number of bins in the lowest level, but the number of bins overall. In this case the number of queries would be 9 queries for the sub-sublevels, plus 3 queries for the sublevels for a total of 12 queries to generate the sublists for the AGE dimension. If the problem also now has 12 income dimensions, there are 144 cross intersections, but the process only has to issue 25 queries (12 for each dimension plus one query to generate the master list) to get the 144 cross-intersections. The more complex the levels are in a single dimension (both in depth as well as in the number of bins/granularity) and the larger are the number of dimensions, the higher the number of computations that are required.

Another feature of the technique is that the analysis can be easily performed over groups of cells. Assume that there are 50 groups of cells (which can be disjoint or overlapping) for which age and income computations are desired. Issuing queries would provide 50 lists of Ids for which 50 different cross tabulations would be computed. Thus, if there are 50 groups of cells for an age/income analysis, the process would combine (e.g., "OR") all of the IDs into a single long master list, which is sorted and deduped (duplicates removed). Thereafter the process is similar to working on a single cell, except that indexes are also kept in each of the original 50 ID lists to determine which of the 50 cross-tabs are incremented as IDs are processed from the master list. The process produces one cross-tabulation table (n×n structure) to hold the count for each of the groups. The process scans down the master list, each of the 50 segment lists, and the dimension sub-lists in the single pass and aggregates values to the appropriate cross-tabulation cells.

Other embodiments are possible for the computation of multiple segments for the same dimension. For instance, lists for each bin in each dimension can be periodically pre-computed for the entire population. Once these lists are generated, the process can use the arbitrary segments of population and compare them against the segmented list of customer IDs to find intersections. That is, no matter how many segments there are, the process does not need to issue any queries to get the lists for the dimension bins. This allows the process to generate cubes very fast for any segment without issuing any query for counts (and only issuing one query to get the fields that are needed to accumulate or process the cells of the cubes).

The process can be expanded to perform other functions on the data represented in the database. Thus, in addition to summing, the process can provide average counts, minimum counts, maximum counts, a standard deviation of another variable (e.g., sum of account balances, averaged tenure), and so forth. The additional variable(s) are brought back as part of the master list and are referenced for the required computations (rather than bringing the variable back with each sub-list). The process can also compute non-intersection of cells.

A number of embodiments of the invention have been described. Nevertheless, it will be understood that various modifications may be made without departing from the spirit and scope of the invention. For example, age, income and territory are examples of 3 attributes or customer characteristic. Other characteristics could be used as dimensions for instance, recency of purchase, frequency of purchase and an aggregate of amount of purchases so called RFM characteristics. Accordingly, other embodiments are within the scope of the following claims.

What is claimed is:

1. A computer implemented method of producing a cross tabulation structure, the method comprising:

issuing by the computer a plurality of queries to a database in communication with the computer, the queries being for multiple sub-levels of data for multiple dimensions of data associated with records in the database to provide sub-lists of sorted record identifiers for the queries, the sub-lists having associated cursors pointing to entries in the sub-lists; and determining by the computer occurrences of intersections of levels of a first dimension of the data associated with records in the database with levels of a second dimension of the data associated with records in the database, by traversing the sub-lists to determine matching record identifiers of sub-lists for the first and second dimensions and incrementing the cursors after the intersection is detected for the first and second dimensions to have the cursors point to subsequent record identifiers in each of the sub-lists until each cursor points to a last record identifier in the sub-lists; and producing the cross tabulation structure from the determined occurrences of intersections.

2. The method of claim 1 further comprising: sorting by record identifiers results from the queries into the corresponding plurality of sub-lists.

3. The method of claim 1 wherein producing comprises computing an aggregate of the intersections and populating the cross-tabulation structure.

4. The method of claim 1 wherein the data has two dimensions and the two dimensions are the first and the second dimensions.

5. The method of claim 1 wherein determining produces a cross-tabulation of counts of occurrences of records in the database that have intersecting levels of data for different dimensions of records in the fields.

6. The method of claim 1 wherein issuing issues queries of the form "Select <Audience ID(s)> from<DB table> where <query condition> order by <Audience ID(s)>" to the database to retrieve audience IDs that satisfy the query.

7. The method of claim 6 wherein the audience ID is a customer identifier and dimensions of data are attributes of customers.

8. The method of claim 1 wherein the audience ID' are customer ID's and attributes are age and income and the query searches the database to retrieve Customer ID's over sub-levels of ages and sub-levels of income.

9. The method of claim 1 wherein determining provides values to indicate how many records exist in each combination of dimension sub-levels.

10. The method of claim 4 wherein issuing issues N queries to produce N sub-lists of audience ID's that are in an first dimension bracket 1 to first dimension bracket N and issues M queries to produce M sub-lists of audience ID's that are in second dimension bracket 1 to second dimension bracket M.

11. The method of claim 3 wherein computing an aggregate of occurrences comprises finding a cross tabulation between the first dimension and the second dimension to populate a N×M cross-tabulation structure.

12. The method of claim 11 wherein computing an aggregate further comprises:

merging each sub-list using corresponding cursors to track an occurrence of a audience ID in the sub lists that matches a current audience ID in a master list of audience ID's, and for each occurrence of a matching audience ID accumulating in a corresponding cell of the cross-tabulation structure a count of audience ID's forms an intersection of first and second dimension sub-levels.

13. The method of claim 11 wherein each cell of the structure is an intersection corresponding to the sub-level under each dimension of the N×M structure, and the cell is populated with a value that represents the number of times that there was an intersection common audience r ID between a sub-level of the first dimension and a sub-level of the second dimension.

14. The method of claim 1 wherein determining is performed over groups of cells.

15. The method of claim 1 wherein sub-lists of sorted record identifiers for the same dimension are periodically pre-computed for the entire population.

16. The method of claim 1 wherein determining further comprises calculating sums, average counts, minimum counts, maximum counts, or a standard deviation of another intersecting dimension.

17. The method of claim 16 wherein a variable that calculating is performed on, is returned as part of a master list and is referenced for subsequent computations.

18. The method of claim 1 wherein if the levels are mutually exclusive determining an occurrence in one sub-list allows the process to skip remaining sub-list in dimension and move to finding an occurrence in a succeeding dimension.

19. The method of claim 1 wherein if a dimension has multiple hierarchical levels that can be rolled up from lower levels, only queries for the lowest level of granularity are executed.

20. The method of claim 1 wherein the dimensions of data are recency of purchase, frequency of purchase and an aggregate of amount of purchases so called "RFM" characteristics of customer historical behavior.

21. A computer program product residing on a computer readable medium for producing a cross tabulation structure, the computer program comprising instructions for causing a computer to:

issue a plurality of queries to a database, the queries being for multiple sub-levels of data for multiple dimensions of data associated with records in the database to provide sub-lists of sorted record identifiers for the queries, the sub-lists having associated cursors pointing to entries in the sub-lists;

determine occurrences of intersections of levels of a first dimension of the data associated with records in the database with levels of a second dimension of the data associated with records in the database, by traversing the sub-lists to determine matching record identifiers of sub-lists for the first and second dimensions, and incrementing the cursors after the intersection is detected for the first and second dimensions to have the cursors point to subsequent record identifiers in each of the sub-lists until each cursors points to a last record identifier in the sub-lists; and produce the cross-tabulation structure from the determined occurrences of intersections, the cross-tabulation structure indicating each time an intersection of the first dimension with levels of the second dimension of the data is found.

22. The method of claim 21 further comprising instructions to: sort by record identifiers results from the queries into the corresponding plurality of sub-lists.

23. The computer program product of claim 21 wherein instructions to produce comprise instructions to compute an aggregate of the intersections and populate the cross-tabulation structure with the aggregate.

24. The computer program product of claim 21 wherein the data has two dimensions and the two dimensions are the first and the second dimensions.

25. The computer program product of claim 21 wherein instructions to issue queries issues queries of the form "Select<Audience ID(s)> from <DB table> where <query condition> order by <Audience ID(s)>" to the database to retrieve audience IDs that satisfy the query.

26. The computer program product of claim 21 wherein the audience ID is a customer identifier and dimensions of data are attributes of customers.

27. The computer program product of claim 21 wherein the audience ID' are customer ID's and attributes are age and income and the query searches the database to retrieve Customer ID's over sub-levels of ages and sub-levels of income.

28. The computer program product of claim 21 wherein instructions to issue, issues N queries to produce N sub-lists of audience ID's that are in an first dimension bracket 1 to first dimension bracket N and issues M queries to produce M sub-lists of audience ID's that are in second dimension bracket 1 to second dimension bracket M.

29. The computer program product of claim 23 wherein instructions to compute, further comprise instructions, to compute an aggregate of occurrences to find a cross tabulation between the first dimension and the second dimension to populate a N×M cross-tabulation structure.

30. The computer program product of claim 29 wherein instructions to compute an aggregate further comprises instructions to:
merge each sub-list using corresponding cursors to track an occurrence of a audience ID in the sub-lists that matches a current audience ID in a master list of audience ID's, and for each occurrence of a matching audience ID accumulating in a corresponding cell of the cross-tabulation structure a count of audience ID's forms an intersection of first and second dimension sub-levels.

31. The computer program product of claim 21 wherein instructions to determine are performed over groups of cells.

32. The computer program product of claim 21 wherein sub-lists of sorted record identifiers for the same dimension are periodically pre-computed for the entire population.

33. The computer program product of claim 21 wherein instructions to determine further comprise instructions to calculate sums, average counts, minimum counts, maximum counts, or a standard deviation of another intersecting dimension.

34. The computer program product of claim 33 wherein a variable that calculating is performed on is returned as part of a master list and is referenced for subsequent computations.

35. The computer program product of claim 21 wherein if the levels are mutually exclusive instructions to determine an occurrence in one sub-list allows the process to skip remaining sub-lists in the dimension and move to find an occurrence in a succeeding dimension.

36. The computer program product of claim 21 wherein if a dimension has multiple hierarchical levels that can be rolled up from lower levels, only queries for the lowest level of granularity are executed.

37. The computer program product of claim 21 wherein the dimensions of data are recency of purchase, frequency of purchase and an aggregate of amount of purchases so called "RFM" characteristics of customer historical behavior.

38. Apparatus, comprising:
a processor,
a memory coupled to the processor, and
a computer storage medium, storing a computer program product for producing a cross tabulation structure, the computer program comprising instructions which when executed in memory by the processor, causing the apparatus to:
issue a plurality of queries to a database, the queries being for multiple sub-levels of data for multiple dimensions of data associated with records in the database to provide sub-lists of sorted record identifiers for the queries, the sub-lists having associated cursors pointing to entries in the sub-lists;
determine occurrences of intersections of levels of a first dimension of the data associated with records in the database with levels of a second dimension of the data associated with records in the database, by traversing the sub-lists to determine matching record identifiers of sub-lists for of the first and second dimensions, and incrementing the cursors after the intersection is detected for the first and second dimensions to have the cursors point to subsequent record identifiers in each of the sub-lists until each cursor points to a last record identifier in the sub-lists; and
produce the cross-tabulation structure from the determined occurrences of intersections, the cross-tabulation structure indicating each time an intersection of the first dimension with levels of the second dimension of the data is found.

39. The apparatus of claim 38 wherein instructions to produce comprise instructions to compute an aggregate of the intersections and populate the cross-tabulation structure with the aggregate.

40. The apparatus of claim 38 wherein instructions to issue, issues N queries to produce N sub-lists of audience ID's that are in an first dimension bracket 1 to first dimension bracket N and issues M queries to produce M sub-lists of audience ID's that are in second dimension bracket 1 to second dimension bracket M.

41. The apparatus of claim 39 wherein instructions to compute, further comprise instructions to compute an aggregate of occurrences to find a cross tabulation between the first dimension and the second dimension to populate a N×M cross-tabulation structure.

42. The apparatus of claim 41 wherein instructions to compute an aggregate further comprises instructions to:
merge each sub-list using corresponding cursors to track an occurrence of a audience ID in the sub-lists that matches a current audience ID in a master list of audience ID's, and for each occurrence of a matching audience ID accumulating in a corresponding cell of the cross-tabulation structure a count of audience ID's forms an intersection of first and second dimension sub-levels.

43. The apparatus of claim 38 wherein instructions to determine are performed over groups of cells.

44. The apparatus of claim 38 wherein sub-lists of sorted record identifiers for the same dimension are periodically pre-computed for the entire population.

45. The apparatus of claim 38 wherein instructions to determine further comprise instructions to calculate sums, average counts, minimum counts, maximum counts, or a standard deviation of another intersecting dimension.

46. The apparatus of claim 45 wherein a variable that calculating is performed on is returned as part of a master list and is referenced for subsequent computations.

47. The apparatus of claim 38 wherein if the levels are mutually exclusive instructions to determine an occurrence in one sub-list allows the process to skip remaining sub-lists in the dimension and move to find an occurrence in a succeeding dimension.

48. The apparatus of claim 38 wherein if a dimension has multiple hierarchical levels that can be rolled up from lower levels, only queries for the lowest level of granularity are executed.

* * * * *